UNITED STATES PATENT OFFICE.

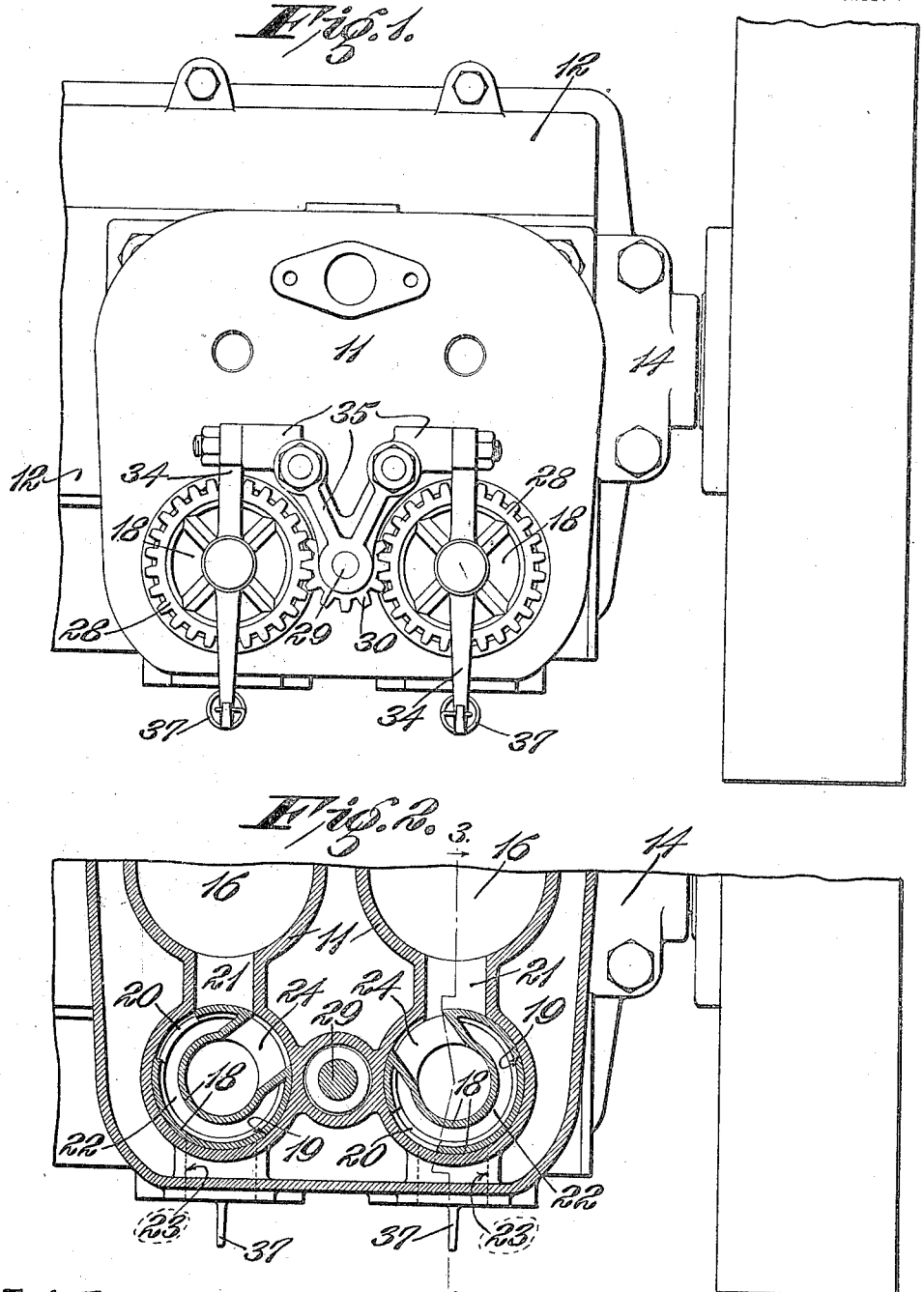

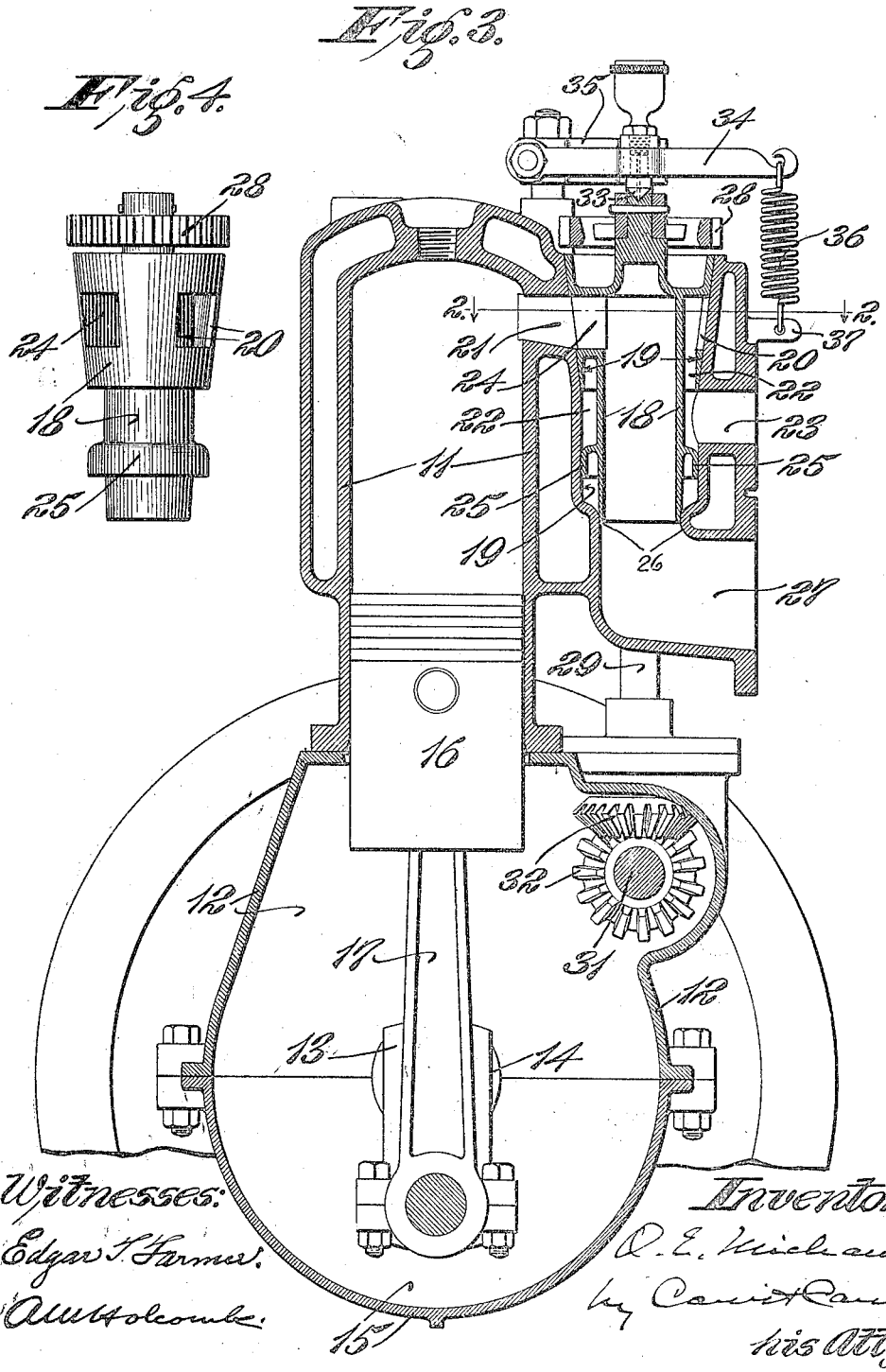

ONESIME E. MICHAUD, OF ST. LOUIS, MISSOURI, ASSIGNOR OF ONE-HALF TO FRITZ A. MULLER, OF McGEHEE, ARKANSAS.

VALVE FOR EXPLOSION-ENGINES.

1,301,477.　　　　　Specification of Letters Patent.　　Patented Apr. 22, 1919.

Continuation in part of application, Serial No. 105,590, filed June 24, 1916. This application filed January 2, 1917. Serial No. 139,998.

*To all whom it may concern:*

Be it known that I, ONESIME E. MICHAUD, a citizen of the United States, and a resident of the city of St. Louis, and State of Missouri, have invented a new and useful Improvement in Valves for Explosion-Engines, of which the following is a specification.

This invention relates to four-stroke cycle explosion engines of the type shown in my pending application filed June 24, 1916, Serial No. 105,590, of which this application is a continuation in part, and particularly concerns the valves and valve operating means, and means for cooling them.

The objects of the invention are simplicity and strength of construction, light weight, accessibility of operating parts, large area of valves and ports, and provision for adequate cooling whereby little attention is required to operate the engine and keep it in good order.

The invention consists in the arrangement of the valves in chambers alongside of the cylinders and in the means for operating them without cams or rocker arms or other devices subject to derangement by expansion due to heat; also in means for supplying lubricant to the valves and for keeping the valves easy running and gas tight; also in the concentric inlet and exhaust valve arrangement whereby the hot exhaust gases are insulated from the moving surfaces of the valve; also in the double ported exhaust valves for diminishing the heat of the exhaust gases discharged from the head end of the cylinder; and also in the details of construction of the several parts as hereinafter described and set forth in the appended claims.

An embodiment of the invention is illustrated in the accompanying drawings, wherein the same figures designate like parts in the several views. In the drawings, Figure 1 is a top plan view of a portion of an engine, showing one pair of cylinders and valve operating means;

Fig. 2 is a horizontal cross-section of the valve chambers and valves, on the line 2—2 in Fig. 3, looking down;

Fig. 3 is a transverse cross-section of one of the cylinders, taken through the axis of the cylinder and valve, on the line 3—3 in Fig. 2, looking in the direction of the arrows; and Fig. 4 is a side view of a rotary valve removed from its chamber.

The engine shown in the drawings comprises vertical cylinders 11 cast in pairs and arranged in a row on the upper half 12 of the crank case. The crank-shaft 13 is horizontally disposed in bearings 14 in the lower side of the upper half 12 of the crank case, and is inclosed on the under side by the lower half 15 of the crank case. The pistons 16 are connected to the cranks of the crank shaft by means of the connecting rods 17.

The inlet valves and exhaust valves are combined in double-walled hollow cylinders 18 which are vertically disposed in a row one alongside of the engine cylinders, and which taper on the exterior at their upper ends to fit in correspondingly tapered chambers 19 formed in enlargements of the side walls of the cylinders. The inlet valve portion surrounds the exhaust valve portion, and consists of a port 20 in the outer wall of the valve which registers with a valve port 21 in the side wall of the cylinder near its upper end. The port 20 communicates with the annular space 22 between the double walls of the top portion of the valve 18; and the lower end of the annular space 22 opens into the intake passage 23 in the side of the cylinder casting.

The exhaust valve is the inner portion of the valve 18, and communicates with the valve port 21 in the top of the cylinder by means of a passage 24 through the annular space 22 alongside of the port 20. The lower end of the valve 18 is cylindrical and is surrounded by a flanged sleeve 25 fitting in the cylindrical lower end of the chamber 19 in the side wall of the cylinder. The lower end of the valve 18 fits in an opening 26 in the lower end of the chamber 19, and is open and leads to the exhaust passage 27 in the side of the cylinder casting.

There is one combined inlet and exhaust valve 18 for each of the cylinders, and the valves for engines having more than one pair of cylinders are arranged in sets of two in each set. The upper ends of the valves 18 project out of the valve chambers and are provided with gears 28. Between each two valves of a set there is arranged a vertical valve operating shaft 29 carrying a gear 30 on its upper end which meshes with the gears 28 of the adjacent valves. The gears 28 have twice as many teeth as the gears 30, causing the valves to be rotated at one-half the speed of the vertical shafts 29. The vertical shafts 29 are rotated by miter gears 32 from a side shaft 31 which is parallel to the crank shaft and which is driven from the crank shaft by any suitable means, such as gears, at the same speed as the crank shaft.

The valves 18 have pivot bearings 33 at their upper ends, and are secured in place in the valve recesses by means of horizontal levers 34. The valve holding levers are arranged horizontally over the upper ends of the valves and are pivoted at their inner ends to brackets 35 bolted to the tops of the cylinders. The outer end of each valve holding lever 34 is held down by a spiral spring 36, which hooks over it. The lower ends of the springs are attached to lugs 37 on the cylinder walls. By unhooking the spring 36 from the end of its valve lever, the valve lever may be swung up away from its valve, and the valve removed for inspection.

By the arangement of the inlet passages in the valves surrounding the exhaust passages, the hot exhaust gases are kept away from the outer walls of the valve, and the cool incoming charge tends to cool the valve and thereby help to maintain its fit in the tapered valve chambers. The valve spring 36 are on the outside of the cylinders away from the heated cylinder walls and valve passages where they can be kept at the proper tension. The concentric arrangement of inlet and exhaust valve passages enables a single moving valve to control both the admission and exhaust of gas to and from each cylinder, and cuts the chances of leakage past the valves in two.

The invention is not restricted to the particular details of construction shown and described.

I claim the following as my invention:

1. An explosion engine having a series of parallel cylinders arranged in sets of two, rotary valves arranged in chambers formed in the side of each cylinder and spring pressed arms bearing on the tops of the valves for retaining them in said chambers, and means operated from the crank shaft and arranged between the valves of each set for rotating the valves in sets of two, whereby the valves of each set rotate in the same direction.

2. An explosion engine having a series of vertically disposed parallel cylinders, rotary valves arranged in chambers alongside of said cylinders, lever arms arranged over the upper ends of said valves, said lever arms being pivotally secured at their inner ends to the cylinders and having downwardly projecting pivot points engaging seats in the upper ends of the valves, tension springs secured to the free ends of said lever arms and to the cylinders for holding the pivot points in engagement with said seats in the upper ends of the valves, and means for supplying oil to said seats.

3. An explosion engine having a series of parallel cylinders arranged in sets of two, a pair of rotary valves arranged alongside of each set of cylinders, lever arms arranged over the upper ends of each of said valves, said lever arms being provided with pivot points engaging the upper ends of each valve, bracket members secured to the tops of the cylinders between the lever arms of each pair, the inner ends of each pair of lever arms being pivotally secured to said bracket members, a vertical shaft arranged between the rotary valves of each pair, the upper end of said shaft being journaled in its adjacent bracket member, and gears connecting the valves of each set of cylinders with the vertical shaft for said set.

4. A rotary valve for an explosion engine, said valve having a cylindrically shaped exhaust passage, an intake passage surrounding said exhaust passage and extending for a portion of its length, said intake and exhaust passages being arranged concentric with respect to each other, ports arranged alongside of each other at one end of the valves, one of said ports communicating with the exhaust passage and the other port communicating with the intake passage, openings in the ends of the intake and exhaust passages, said openings being displaced lengthwise with respect to each other, and a concentric flange surrounding the walls of the exhaust passage near its open end.

5. A rotary valve for an explosion engine, said valve having a tapered outer wall inclosing concentric inlet and exhaust passages, two ports in the outer wall arranged alongside of each other, one of said ports communicating with the exhaust valve passage and the other port communicating with the intake valve passage, the outer wall terminating short of the end of said valve, and the end of said valve having an opening into one of said chambers, and a cylinder flange surrounding said open end and spaced from the end of said outer wall.

Signed at St. Louis, Missouri, this 30th day of December, 1916.

ONESIME E. MICHAUD.

Copies of this patent may be obtained for five cents each, by addressing the "Commissioner of Patents, Washington, D. C."